No. 645,426. Patented Mar. 13, 1900.
J. VON ORLOWSKY.
APPARATUS FOR TREATING CALCIUM CARBID.
(Application filed Dec. 29, 1898.)
(No Model.)
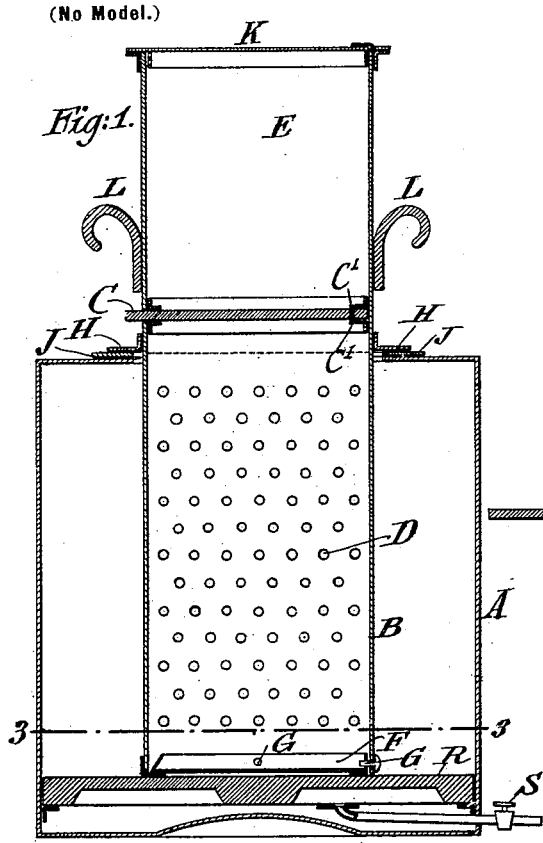
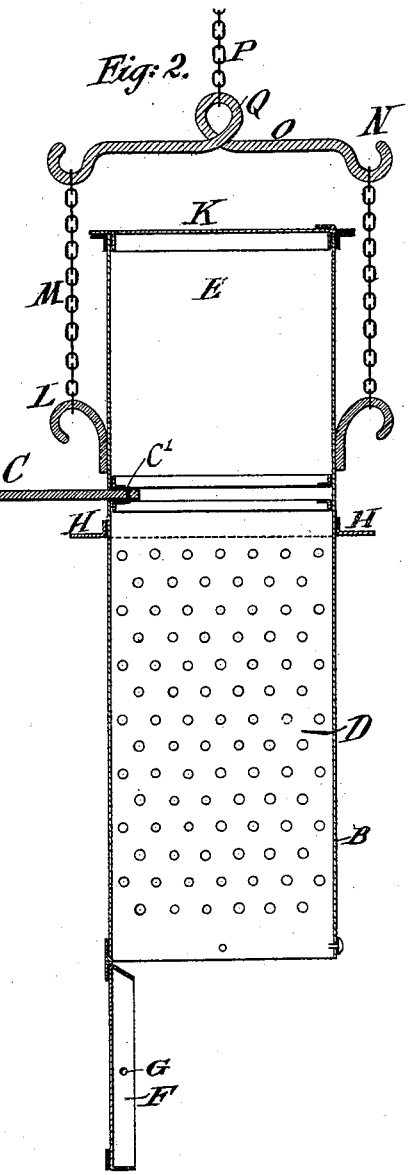
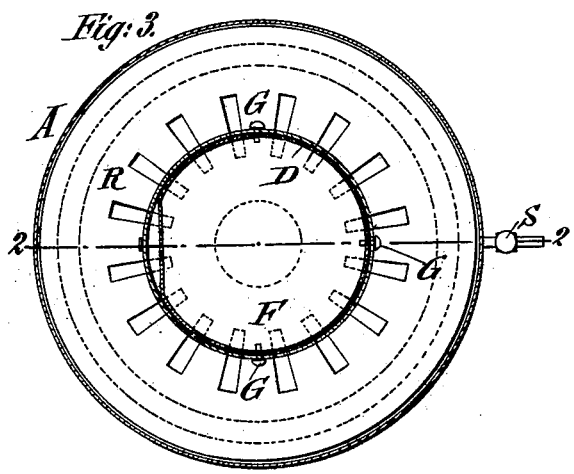
WITNESSES:
INVENTOR
Julius von Orlowsky
BY
ATTORNEYS

UNITED STATES PATENT OFFICE.

JULIUS VON ORLOWSKY, OF ST. PETERSBURG, RUSSIA.

APPARATUS FOR TREATING CALCIUM CARBID.

SPECIFICATION forming part of Letters Patent No. 645,426, dated March 13, 1900.

Application filed December 29, 1898. Serial No. 700,656. (No model.)

*To all whom it may concern:*

Be it known that I, JULIUS VON ORLOWSKY, a subject of the Czar of Russia, and a resident of St. Petersburg, Russia, have invented a new and Improved Apparatus for Treating Calcium Carbid, which is fully set forth in the following specification.

This invention relates to an apparatus for treating calcium carbid so that it may resist atmospheric action.

It is well known that calcium carbid is a very hygroscopic substance, greedily absorbing the moisture of the air, and consequently becoming decomposed. To avoid this drawback, various methods have been suggested for treating the calcium carbid, but they all proved unsuccessful when applied in practice. Thus, for instance, Bolton (United States Patent No. 596,139) tried to impregnate calcium carbid in a vacuum with a substance which does not mix with water, such as stearin, paraffin-oil, and similar liquids. Another inventor, Létang, (British Patent No. 21,572, 1896,) covered calcium carbid with a shell or layer of glucose, petroleum, and carbonate of lime. Lundström (Swiss Patent No. 1,275, 1897) covered the carbid with a layer of linseed-oil, turpentine, stearin, paraffin-wax, and colophony or with a mixture of these substances, so that the carbid before being used had to be freed from the coating by dissolving or burning it away. There has also been a suggestion to preserve and to pack carbid in the same way as potassium or sodium—*i. e.*, under petroleum—so so to prevent the access of air or water. As stated, neither these nor other processes proved successful in practice, owing to their not giving the results expected. By the apparatus forming the subject of the present invention a calcium carbid can be produced which absolutely resists the action of air and which has effectively withstood a journey by trains and steamers that lasted for several months, the substance being contained in an ordinary wooden box, without any appreciable decomposition. Moreover, calcium carbid made by my apparatus, hereinafter described, has the great advantage that the action of water on the impregnated carbid is not as effervescent as an ordinary carbid, so that the production and generation of acetylene gas may be easily effected in simple apparatus.

The apparatus used for impregnation is illustrated in the accompanying drawings.

Figure 1 is a vertical section of the apparatus; Fig. 2, a vertical section of the inner reservoir; and Fig. 3 is a transverse section on line 3 3, Fig. 1.

A is an iron casing, which may be, if desired, cylindrical, rectangular, or of any other suitable shape. On the bottom of the casing is arranged a hollow grate or false bottom R, serving to receive the sediment that may collect in the casing. In the latter is also arranged an iron reservoir B, divided by a valve C into two compartments E and D of unequal size. The valve may be guided in its seat in any desired manner and is provided with two stop-pins C', which when the valve is opened prevent it from coming out completely from its seat. The reservoir is provided with a hinged bottom F, so that it may be opened from the outside by withdrawing three bolts G, arranged in the side walls, as shown in Fig. 2. The walls of the lower chamber D (arranged under the valve C) of the reservoir B, as well as the hinged bottom F, are provided with a number of round holes of about one centimeter in diameter, so that the contents of the reservoir B can easily communicate with the outer casing. Under the valve C are secured to the wall of the reservoir, all round it, angle-irons H, which as soon as the inner reservoir is introduced and rests on the grate R intercept the admission of air into the casing by pressing with a certain amount of elasticity against the lower side of the casing A. Intermediate asbestos parts J serve to make the closure air-tight. The receptacle B is provided at the top with a cover K, fitting easily, but closing sufficiently tight. This cover is also hinged and may be easily closed and opened. Over the valve are arranged handles L L at the opposite sides of the reservoir B. To these handles are attached chains or cords M, the other ends of which are secured to the end hooks of a cross-beam O to the ring Q, in the center of which is attached a third chain or cord P, connected to a winch or any other suitable hoisting device. This arrangement serves to introduce the reservoir B into the casing A and to withdraw it therefrom. The bottom of the casing A is provided at a suitable point with a branch S, which can be closed by means of a cock and serves for emptying the contents of the casing and cleaning it.

The impregnation is effected as follows: Having introduced the reservoir B into the casing and closed the valve C, the casing is filled to about three-quarters of its volume with the impregnating liquid, which must be, as far as possible, neither cold nor hot. The blocks of carbid of calcium arriving in red-hot state from the furnace are broken up as quickly as possible into pieces of a few inches square and placed in a box, which must be at once closed. The contents of this box are emptied (the valve C being closed) into the upper compartment E of the reservoir B and the cover closed. The valve C is then quickly withdrawn, so that the carbid falls into the lower compartment D, whereupon the valve is closed. The carbid thus comes in a red-hot state in contact with the impregnating liquid. As the admission of air is completely prevented, the vapors generated can neither burn nor escape. They are retained in the large cold mass of the impregnating liquid and in the upper empty space of the casing A and are immediately condensed. At the end of some little time, depending on the quantity of carbid treated—say about two to three hours for a weight of one hundred and twenty kilograms—the reservoir B is lifted out by means of the winch, and after the impregnating liquid has run off the reservoir is lowered and a basket placed underneath to receive the finished carbid. The bolts G are then withdrawn, and consequently the cover F falls, and the contents of the chamber D are discharged into the basket. The bottom F is then closed, the reservoir B introduced into the casing A, and when the impregnating liquid has sufficienty cooled a new charge of carbid can be at once impregnated. The impregnated carbid in the basket is then broken up while still hot and packed in wooden tubs or boxes.

The whole impregnating operation must take place very quickly from the moment the carbid comes from the furnace until its introduction into the impregnating liquid in order to avoid cooling, and consequently non-uniform impregnation.

It is stated above that freshly-prepared carbid in an incandescent state is alone adapted to be thoroughly impregnated. Cold carbid is, as is well known, as hard as stone, and no liquid can penetrate into it. If cold carbid were reheated to the incandescent state and the impregnation attempted in a vacuum, it would be useless. By reheating carbid to incandescence it is caused to decompose, owing to the carbon being consumed. A carbid of less value is formed, which to a certain depth from the surface is composed of lime, said layer of lime lying loosely on the inner core of carbid. It is true that this layer could be impregnated; but this would be no safeguard, as it breaks away at the slightest shock.

The carbid prepared in the manner hereinbefore described resists the action of the atmosphere in a remarkable manner and is in no way changed by the impregnation. As it is completely permeated by the impregnating liquid, it has a loosely-coherent structure and a darker appearance than ordinary carbid.

I claim—

1. An apparatus for treating calcium carbid, consisting of an air-tight outer casing, a reservoir removable from said casing, and constructed with two compartments, the upper of which is air-tight and the lower of which is perforated, and a door for shutting off or connecting said compartments, substantially as set forth.

2. An apparatus for treating calcium carbid, consisting of an air-tight outer casing having a perforated or grated false bottom, a reservoir removable from said casing, and having two compartments, the upper of which is air-tight and the lower of which is perforated, and a door between said compartments, substantially as set forth.

3. An apparatus for treating calcium carbid, consisting of an air-tight outer casing, a reservoir removable from said casing and having a movable bottom, said reservoir having two compartments, the upper of which is air-tight and the lower of which is perforated, and a door between said compartments, substantially as set forth.

4. In an apparatus for treating calcium carbid, a reservoir having two compartments and provided with a movable bottom, the upper compartment being air-tight and the lower compartment being perforated, and a door between the compartments, substantially as set forth.

In testimony whereof I have signed this specification in the presence of two subscribing witnesses.

JULIUS VON ORLOWSKY.

Witnesses:
WLADIMIR HOLKE,
EMILE LEDREL.